3,422,081
PROCESS FOR PREPARING STEREOREGULAR ACRYLAMIDE POLYMERS WITH AN ALKALI METAL ALKOXIDE AND POLYVALENT METAL SALT CATALYST

Herman Wexler, Chicago, Ill., assignor to Continental Can Company, Inc., New York, N.Y., a corporation of New York
No Drawing. Filed Nov. 15, 1965, Ser. No. 507,652
U.S. Cl. 260—89.7      11 Claims
Int. Cl. C08f 3/90; C08f 1/70

---

ABSTRACT OF THE DISCLOSURE

Linear, highly crystalline stereoregular polyamides are prepared by polymerizing an ethylenically unsaturated amide having the formula

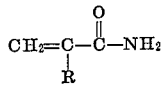

wherein R is an alkyl group of 1 to 2 carbon atoms, in the presence of a catalytic system composed of an alkali metal alkoxide and the salt of a polyvalent metal, such as copper, manganese, aluminum, iron, cobalt, nickel, chromium, vanadium, titanium and zinc.

---

This invention is directed to a new, linear highly crystalline regular polymer of an acrylamide having the formula:

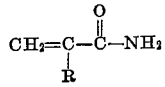

wherein R is a saturated aliphatic hydrocarbon radical of 1 or 2 carbon atoms and includes, for example, methacrylamide.

In accordance with this invention, it is proposed to synthesize a highly crystalline stereoregular polyamide by the stereoregulation of a hydrogen-addition polymerization. This may be accomplished by the hydrogen-addition polymerization of methacrylamide, for example, by utilizing a basic catalytic system. This general approach to polymer chemistry has led previously to such commercial material as isotactic polypropylene and cis-polyisoprene. The stereoregular highly crystalline polyamides of this invention have been found to have a higher melting point, a higher crystallinity and a lower degree of water solubility in comparison to the irregular acrylamide polymers. These polymers are optically active and were found to exhibit high values of optical rotation in the ultraviolet spectrum.

Presently, it is known to polymerize acrylamides or the other ethylenically unsaturated amides by self-polymerization or copolymerization with other unsaturated compounds. This type of polymerization, however, results from a free-radical mechanism either by the addition of heat or the addition of a peroxide catalyst with the polymerization taking place between the ethylene double bonds. Linear polyamides have been prepared also by the condensation of an amino acid or by the condensation of a dicarboxylic acid with an organic diamine. Still other polyamides have been prepared by catalyzing the polymerization of acrylamide or other ethylenically unsaturated amides with a basic catalyst to obtain linear polymers having an irregular rather than a stereoregular configuration. In order to attain polymers of methacrylamide, for example, which have optical activity, it is necessary to form asymmetric carbon atoms that contain four different groups. Thus, as distinguished from acrylamide, methacrylamide has a non-polar lateral substituent which would ordinarily tend to decrease the melting point and it would be expected that the methacrylamide polymer would have a lower melting point than the acrylamide polymers. However, by forming a stereoregular polymer of methacrylamide, with the lateral substituents, it was found that the melting point is higher than that of the irregular structure. Thus, it is possible to polymerize methacrylamide with a catalytic system to obtain a preponderance of one form wherein the asymmetric carbon atoms have the same steric configuration.

The catalysts used to initiate the polymerization to obtain stereoregular polymers comprises a combination of an alkali metal alkoxide wherein the alkyl group has from 1 to 4 carbon atoms and a polyvalent metal salt such as aluminum isopropoxide, nickel chloride, copper sulfate, manganese acetate, etc. It may be theorized that the polymerization of the monomer proceeds by a variation of the Michael reaction, initiated by a base, with the stereochemical control of the propagation step being through a coordination-complex. The Michael reaction which involves the use of a base catalyzed addition of an active hydrogen compound to an activated unsaturated system may be illustrated as follows:

(I)

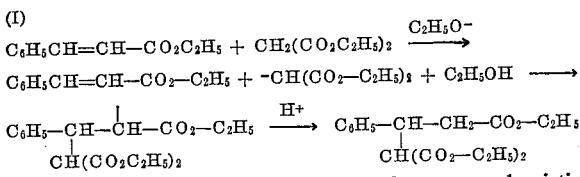

If the above-reaction is considered from a mechanistic standpoint, as the beta-addition of an anion to an olefin activated by an electron withdrawing functions, it can be appreciated that it is a simple model of anionic polymerization. A reaction of the adduct with a proton donor corresponds to the termination or transfer step. Certain adaptations of this reaction have been applied to this invention by the synthesis of acrylamide polymers, wherein during polymerization the hydrogen ion migrates to produce a polyamide according to the following equation:

(II)

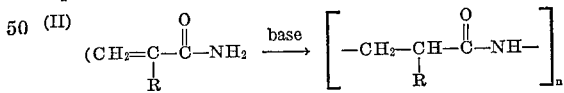

It can be seen that an asymmetric carbon atom is formed during the polymerization, and in view of the previous work by Michael, it would be expected that an equal amount of two enantiomorphic forms would be formed. However, in order to obtain all or at least a prevailing amount of one of the stereo-isomers, stereochemical control must be exerted during the course of the polymerization.

The polymer may be separated into water-soluble and water-insoluble portions with the water-soluble polymer having a melting point ranging from about 290°–305° C. with the water-insoluble portions having a somewhat lower melting point. The crystallinity of the water-insoluble polymer is moderately high in comparison to the water-soluble material, with the glass transition temperatures being 90° C. and 96° C. for the methacrylamide polymer. The stereoregularity of these polymers may be determined by the optical activity in terms of rotation which ranges from about —0.3° to +2.8° at 589 m$\mu$. This activity was verified by optical rotary dispersion in which a specific rotation of +270° at 320 m$\mu$ was obtained.

Accordingly, it is an object of this invention to provide a new highly-crystalline linear stereoregular polymer of an acrylamide, such as methacrylamide, wherein for long portions of the main carbon chain the asymmetric carbon atoms have the same steric configuration.

It is still another object of this invention to provide a highly-crystalline linear stereoregular polymer which may be used as a chelating agent by complexing with heavy metal ions, such as the mercuric ion.

It is still another object of this invention to provide a stereoregular polymer of methacrylamide which may be used as a metal coating composition.

It is still another object of this invention to provide a method of preparing highly-crystalline linear stereoregular polymers of acrylamides by polymerizing the monomer in the presence of a catalytic system comprising an alkali metal alkoxide and a polyvalent metal salt.

It is still a further object of this invention to provide a method of controlling the stereoregularity of a hydrogen-addition polymerization by utilizing a basic catalyst system.

These and other objects of the invention will become obvious from a further and more detailed description to follow.

It has been discovered that highly-crystalline linear stereoregular polymers of an acrylamide, e.g., methacrylamide, may be obtained by polymerizing the monomer in the presence of a catalyst system comprising a combination of an alkali metal alkoxide wherein the alkyl group contains from 1 to 4 carbon atoms and a polyvalent metal salt.

The preferred alkali metals include sodium, potassium and the lithium compounds of the lower aliphatic alcohols, such as sodium methoxide, sodium isopropoxide, sodium ethoxide, lithium methoxide, etc. The polyvalent metal salts used in combination with the alkali metal alkoxide as the catalyst system may include the salts of copper, manganese, aluminum, iron, cobalt, nickel, chromium, vanadium, titanium and zinc. Various salts of these polyvalent metals may be used with the alkali metal alkoxide and include, for example, the acetates, chlorides, sulfates, naphthenates, alcoholates and the like.

Normally, the catalyst system is used in the polymerization in amounts ranging up to about 5% by weight of the acrylamide, and more preferably in amounts ranging from about 2 to 4% by weight of the monomer. The relative proportion of the alkali metal alkoxide to the polyvalent metal salt ranges from about 1 part by weight of the polyvalent metal salt to about 1–2 parts by weight of the alkali metal alkoxide. The polymerization may take place in the presence of inert organic solvents which do not contain active hydrogens and preferably include solvents having boiling points ranging from about 120° to 150° C. While solvents which have a high polarity may be used, it is preferred to use those solvents which have a moderate polarity, such as for example, chlorobenzene, dichlorobenzene, acetone, nitrobenzene, dimethylformamide, acetonitrile and the like.

It is generally accepted that if the structure of a polymer is more stereoregular, benefits accrue among the various physical and mechanical properties. Thus, by controlling to some degree the growing-end of the polymer chain during the propagation step, the configuration of the asymmetric carbon atoms may be regulated such that each has the same configuration, i.e., either the D or L configuration. Thus, a stereoregular and optically active polymer may be obtained. The mechanism postulated for this type of reaction may be summarized as follows:

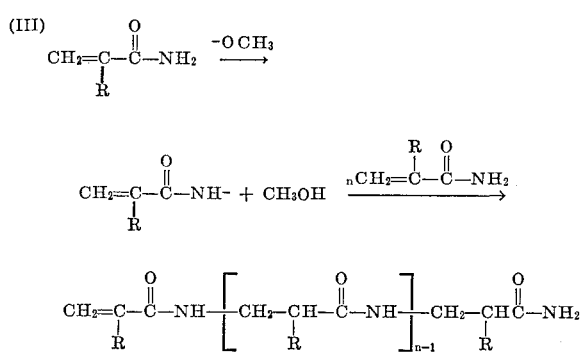

By this general technique, stereoregular polymers of methacrylamide, for example, may be prepared, the structure of which may be proved by acid hydrolysis of the polymer to form alpha-methyl-beta-alanine, as illustrated below:

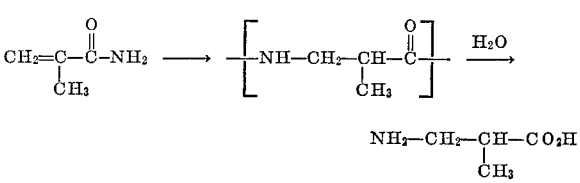

The polymerization normally is conducted at moderate temperatures with an inert organic solvent in the presence of the basic catalyst system and a free-radical polymerization inhibitor. The catalyst system may comprise a a polyvalent metal salt including, for example, copper sulfate, nickel chloride, cobalt naphthenate, manganese acetate, cobalt chloride, aluminum isopropoxide, or ferric chloride. The preferred free-radical polymerization inhibitor includes N-phenyl-2-naphthylamine, but many other known compounds may be used.

The methacrylamide polymer is separated into water-soluble and water-insoluble portions where it was found that the insoluble portions had melting points in the range of 290° to 305° C., whereas the water-soluble portions had a lower melting point. The polymer exhibited a crystalline melting point comparable to the softening point with second order transition temperatures being approximately one-third of the crystalline melting point. The data illustrating this is shown below:

TABLE I.—COMPARISON OF MELTING POINT, CRYSTALLINE MELTING POINT AND GLASS TRANSITION TEMPERATURE OF THE POLYMER

| Monomer | Polymer Softening Point, °C.[1] | Monomer M.P., °C. | Polymer Crystalline Melting Point, °C.[2 3] | $T_g$, °C.[3] |
|---|---|---|---|---|
| Methacrylamide | 290–295 dec | 110 | 290, 271 | 90 |
| Do | 300–305 dec | 110 | 297, 282, 132 | 96 |

[1] Determined on a Fish-Johns melting point apparatus.
[2] Several separate endotherms detected.
[3] Obtained by Differential Thermal Analysis technique.

The following table illustrates the conditions used during the polymerization of methacrylamide in accordance with this invention:

tated by a magnetic stirrer and to the mixture was added about 0.20 gram of sodium methoxide and 0.64 gram of manganese acetate while being stirred for a period of

TABLE II.—POLYMERIZATION OF METHACRYLAMIDE [1]

| Name [2] | Catalyst | | Products | | | | | | Comments |
|---|---|---|---|---|---|---|---|---|---|
| | | | Solvent | | | Water | | | |
| | Mole, Percent | Time, Hour | Temp., °C. | Insol., Percent | Sol., Percent | Insol. (A) Percent | M.P., °C.[3] | Sol (B) Percent | M.P., °C.[3] | |
| NaOMe+AIP | 3.15 / 3.15 | 14.50 | 120 | 100 | 3.5 | 64.5 | 300–305 | 41.5 | 270–275 | A, Tg=96°, 53% crystallinity A, $[\alpha]_D^{25}=-0.3°$ |
| NaOMe+FeCl₃ | 3.15 / 3.15 | 22.75 | 120 | 92 | 3.5 | 0.36 | >360 | 60.5 | 113–115 | |
| NaOMe+CoNap | 3.15 / 3.15 | 13.83 | 125 | 79 | | 15 | | | | |
| NaOMe+CuSO₄ | 6.30 / 3.15 | 22.75 | 130 | 100 | 4.7 | 32.0 | 300–305 | 60.5 | 155–160 | A, $[\alpha]_D^{25}=-2.4°$<br>B, $[\alpha]_D^{25}=-1.2°$ |
| NaOMe+NiCl₂ | 3.15 / 3.15 | 23 | 130 | 100 | 3.0 | 36.5 | 295–300 | 57.0 | 165–170 | A, $[\alpha]_D^{25}=-0.4°$<br>B, $[\alpha]_D^{25}=-0.8°$ |
| NaOMe+CoCl₂ | 3.15 / 3.15 | 21.75 | 132 | 99 | 2.0 | 5.0 | >360 | 41.9 | 100–105 | |
| NaOMe+MnAc₂ | 6.30 / 3.15 | 17.67 | 132 | 100 | 4.0 | 37.5 | 295–300 | 56.5 | 140–150 | A, $[\alpha]_D^{23.5}=+2.8°$,<br>B, $[\alpha]_D^{25}=-0.6°$ |
| NaOMe+AIP [e] | 6.28 / 3.14 | 20.42 | 131 | 100 | 1.83 | 29.8 | 292–297 | 65.8 | 220–225 | |

[1] 10 g. (0.1178 mole) monomer, 200 ml. chlorobenzene solvent and 0.02 g. N-phenyl-2-naphthylamine inhibitor. Yields reported as percent of starting material. [2] NaOMe, Sodium methoxide, AIP, Aluminum isopropoxide; FeCl₃, Ferric chloride, CoNap, Cobalt naphthenate; CuSO₄, Copper sulfate, NiCl₂, Nickle chloride; CoCl₂, Cobalt chloride, MnAc₂, Manganese acetate. [3] Softening points taken on Fisher-Johns melting point apparatus. [4] 30 g. (0.353 mole) monomer, 300 ml. chlorobenzene, 0.06 g. N-phenyl-2-naphthylamine used.

In general, stereoregular structures in the solid state result in a better packing of the polymer molecules which is manifested in crystallinity. Stereochemically ordered structures also lead to a higher crystallinity and have been characterized in terms of crystallinity, as shown by X-ray data. One drawback, however, to the correlation of crystallinity with the amount of stereoregularity is that the physical treatment of the polymer has an effect upon the crystallinity to the extent that it is necessary to treat each polymer exactly the same before any weight can be placed on this type of measurement. X-ray data indicating the relative amounts of crystallinity or stereoregularity of methacrylamide polymers prepared in accordance with this invention is shown below:

TABLE III.—X-RAY DIFFRACTION DATA OF POLYAMIDES

| Monomer | Crystallinity, percent | d Spacings,[1] Å. |
|---|---|---|
| (1) Methacrylamide | 42 | 5.15(s), 4.37(s), 3.43(w) |
| (2) Methacrylamide | 53 | 5.12(s), 4.35(s), 3.96(w) |
| (3) Methacrylamide | Low | 5.15(s), 4.33(s), 3.36(m) |

[1] Intensity for d spacings in (1) and (2): 5.15–70; 4.37–100. s—strong, w—weak, m—medium.

A typical illustration of preparing stereoregular polymers of methacrylamide in accordance with the process of this invention is shown below:

Example I

About 10 grams of methacrylamide (0.118 mole) were added to about 200 mls. of chlorobenzene which contained about 0.02 gram of N-phenyl-2-naphthylamine, in a flask fitted with a reflux condenser and protected with a calcium chloride drying tube. The ingredients were agitated by a magnetic stirrer and to the mixture was added about 0.20 gram of sodium methoxide and 0.64 gram of manganese acetate while being stirred for a period of about 17½ hours at a temperature of about 132° C. After allowing the product to cool, the polymer was obtained by filtration, dried and then extracted with 200 mls. of boiling water over a period of about two hours. The water-insoluble product was removed by filtration and dried. The product had a melting point of about 295° to 300° C., a specific rotation of $[\alpha]_D^{23.5}=+2.8°$ in formic acid. The water solution was evaporated and the water-soluble polymer was isolated which had a melting point of about 140° to 150° C. After dialysis in water, the product had a specific rotation of $[\alpha]_D^{25}=-0.6°$ in water. The optical rotary dispersion of the water-insoluble product exhibited a specific rotation of +78° at 320 mμ.

Example II

| | Parts by weight |
|---|---|
| Methacrylamide | grams 60 |
| Chlorobenzene | ml 50 |
| Phenyl naphthylamine | grams 0.1 |
| Sodium methoxide | do 2.0 |
| Manganese acetate | do 3.2 |

The polymerization of the above was carried out at 130° C. for a period of about 24 hours by the same procedure as Example I. A water-insoluble polymeric product was obtained which had a specific rotation of $[\alpha]_D^{25}=-16.3$ in formic acid.

The polymers prepared from methacrylamide particularly displayed optical activity, which ranged in values from about −0.3° to +2.8° at 589 mμ. The data indicated for this particular stereoregular polymer is shown below:

TABLE IV.—OPTICAL ACTIVITY OF POLY[α-METHYL-β-ALANINE]

| Catalyst | $[\alpha]_D^{25}$ Polymer | |
|---|---|---|
| | Water Insoluble [1] | Water Soluble [2] |
| (1) Sodium Methoxide Copper Sulfate | −2.4° | −1.2° |
| (2) Sodium Methoxide Nickel Chloride | −0.4° | −0.8° |
| (3) Sodium Methoxide Manganese Acetate | +2.8° | −0.6° |

[1] In formic acid.
[2] In water.

The optical activity is generally accepted as being an indication of the formation of asymmetric carbon atoms with the creation of an excess of one form of the asymmetric carbon over its enantiomer. The amount or proportion of asymmetric carbon atoms formed, however, whether large or small, may not be determined exactly from the values reported due to the lack of a direct relationship between the stereochemistry and the total rotation. Complete stereoregularity of a material might result even in a very small rotation in visible light. For example, in a recent publication it was shown that a naturally occurring, stereoregular polymer of beta-hydroxybutyric acid showed negligible optical rotary power at 589 m$\mu$. However, when examined in the ultraviolet region, the optical rotation rose to +40° at about 290 m$\mu$. To further corroborate the configuration of the instant polymers, data of optical rotary dispersion was obtained. This data which shows the change in optical rotation with a change in the wave length of light, has been adapted to provide valuable information regarding the structure of optically active organic compounds and particularly the polyamides. Thus, for example, the data in Table V illustrates the optical rotary dispersions of a polymer of methacrylamide polymerized in the presence of a sodium methoxide-manganese acetate catalyst.

Table V.—Optical rotatory dispersion of polyamide in formic acid solution

| Wave length, m$\mu$: | $[\alpha]^{24}$, degrees |
| --- | --- |
| 589 | 0.0 |
| 500 | +2.8 |
| 435 | +0.4 |
| 380 | +28 |
| 350 | +7 |
| 340 | +28 |
| 330 | +56 |
| 320 | +278 |
| 315 | 0.0 |
| 310 | −521 |

The data confirms fully the polarimetric data in showing that the optical rotation, which is very small at the wave length of sodium light, remains so until approximately 400 m$\mu$ but then rises to a point of +278° at 320 m$\mu$. Its value after this point falls and is obscured, due to the experimental difficulties in taking further readings in the ultraviolet region, with subsequent high experimental error.

Since the stereoregularity of the instant polymers manifests itself as optical activity, it is advisable to understand that there are two possible approaches to the preparation of optically active polymers. The one technique involves the use of monomers which are optically active while the other is concerned with the technique of asymmetric induction. Asymmetric induction consists primarily of creating an asymmetric center, either due to the influence of an asymmetric center previously existing in the molecule or due to the influence of an asymmetric reagent, catalyst or some other physical influence.

In asymmetric induction, two requirements exist for the production of true optical activity during polymerization. The propagation reaction must be under some degree of steric control by an asymmetric center so that one diastereometric transition state will be favored over the other. The second requirement is that true structural differences are introduced into the chain close to the substituted carbon atom. The amount of optical activity a polymer will exhibit depends not only on the specific polymerization but also on the final structure of the polymer. In general, stereoregular polymers, such as the alpha olefins, for example, which have been prepared from inactive monomers, are not optically active. Since optical activity is determined primarily by groups which are in the immediate vicinity of an asymmetric carbon atom, as the point of structural dissimilarity is moved further from the asymmetric center, the optical activity will decrease rapidly to a negligible value.

Early attempts to induce optical activity in polymers made use of optically active acyl peroxides in hopes of regulating the chain growth in a preferred manner but in most instances optically active polymers were not obtained. Thus, it was unexpected to find that stereoregular polymers of methacrylamide could be obtained, for example, by utilizing a catalyst system comprising a combination of an alkali-metal alkoxide and a polyvalent metal salt.

The relationship of the polymers of this invention to bio-chemically important materials has been established and there is some indication of their possible use as edible packaging materials. In addition, the polymers form insoluble complexes with heavy metal ions such as the mercuric ion, indicating their utility as a chelating polymer. This also suggests the use of the polymer to remove heavy metals from solutions, as well as for metal coating, because of their reactivity with metal.

While the above invention has been described with respect to a number of specific embodiments, it is obvious that there are other modifications and variations which can be used without departing from the spirit of the invention, except as more particularly pointed out in the appended claims.

I claim:

1. A method for preparing a linear, highly crystalline stereoregular polyamide which comprises polymerizing an ethylenically unsaturated amide having the formula:

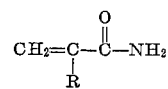

wherein R is an alkyl group having 1 to 2 carbon atoms in an inert solvent with boiling points from 120° to 150° C. in the presence of a catalytic system consisting essentially of 1 to 2 parts by weight of an alkali metal alkoxide wherein the alkyl group has from 1 to 4 carbon atoms and one part by weight of a salt of a polyvalent metal selected from the group consisting of copper, manganese, aluminum, iron, cobalt and nickel and in the presence of a free-radical polymerization inhibitor.

2. The method of claim 1 further characterized in that the alkyl group is a methyl group.

3. The method of claim 1 further characterized in that the alkyl group is an ethyl group.

4. The method of claim 1 further characterized in that the alkali metal alkoxide is sodium methoxide and the polyvalent metal salt is manganese acetate.

5. The method of claim 1 further characterized in that the alkali metal alkoxide is sodium methoxide and the polyvalent metal salt is copper sulfate.

6. The method of claim 1 further characterized in that the alkali metal alkoxide is sodium methoxide and the polyvalent metal salt is nickel chloride.

7. The method of claim 1 further characterized in that the alkali metal alkoxide is sodium methoxide and the polyvalent metal salt is cobalt naphthenate.

8. The method of claim 1 further characterized in that the catalyst system is present in the polymerization of the monomer in an amount ranging up to about 5% by weight of said monomer.

9. The method of claim 8 further characterized in that the catalyst is present in the polymerization in an amount ranging from about 2 to 4% by weight of said monomer.

10. The process of claim 1 further characterized in that the polymerization of the acrylamide monomer takes place in the presence of an inert-organic solvent at temperatures ranging from about 115° to about 150° C.

11. The method of claim 10 further characterized in that the inert-organic solvent is selected from the group consisting of chlorobenzene, dichlorobenzene, acetone, nitrobenzene, dimethylformamide and acetonitrile.

References Cited

FOREIGN PATENTS 26,792   1963   Japan.

OTHER REFERENCES

Synthesis of Poly-β-alanine from Acrylamide by Breslow, Hulse & Matlack, J. Am. Chem. Soc., 79, 3760 (1957).

Chem. High Polymers, Japan, 20, 364 (1963).

Makromol, Chem. 67. 240 (1963).

JOSEPH L. SCHOFER, *Primary Examiner.*

WILLIAM F. HAMROCK, *Assistant Examiner.*

U.S. Cl. X.R.

260—32.6, 33.8; 252—429, 430.